Patented Apr. 12, 1938

2,113,813

UNITED STATES PATENT OFFICE 2,113,813

METHOD OF PRODUCING CARBOXYLIC ACIDS FROM NITROHYDROCARBONS

Samuel B. Lippincott, Terre Haute, Ind., assignor to Commercial Solvents Corporation, Terre Haute, Ind., a corporation of Maryland No Drawing. Application June 14, 1937,
Serial No. 148,108

7 Claims. (Cl. 260—112)

My invention relates to the production of carboxylic acids. More specifically, my invention relates to the production of carboxylic acids from primary nitrohydrocarbons.

The primary nitrohydrocarbons may be obtained according to a number of different reactions, but are most economically produced by vapor phase nitration of saturated hydrocarbons in accordance with the process of U. S. Patent 1,967,667 by H. B. Hass, E. B. Hodge and B. M. Vanderbilt. The nitroparaffins produced by this process from petroleum hydrocarbons constitute an advantageously cheap source of aliphatic compounds for the production of organic chemicals. I have now found that carboxylic acids may be produced from these nitrohydrocarbons with consistently satisfactory yields and conversions, by reacting the nitrohydrocarbons with sulfonic acids under the controlled conditions described below.

The process of my present invention may be briefly described as comprising subjecting the primary nitrohydrocarbon, preferably at a temperature of 100° C. to 160° C. to the action of at least one mol. of a sulfonic acid, having a dissociation constant in excess of $10^{-2}$, per mol. of nitrohydrocarbon, the initial concentration of said acid preferably being at least 80% by weight, and providing either initially or at a later stage of the reaction at least 1 mol. of water per mol. of nitrohydrocarbon to complete the conversion to the carboxylic acid stage. According to this reaction one mol. of hydroxylamine is formed for each mol. of carboxylic acid produced, but under certain reaction conditions there is a tendency for the hydroxylamine to be destroyed, and these two products are therefore not always recovered in equimolecular amounts. The hydroxylamine is, of course, produced in the form of a sulfonic acid salt, which may be separated from carboxylic acid and unreacted materials in any suitable manner. The carboxylic acid may be recovered from the reaction mixture according to known methods such as distillation or extraction.

The nitrohydrocarbons which are suitable for my process constitute the primary nitrohydrocarbons, as, for example, the primary nitroparaffins, and the aryl or cycloalkyl substituted primary nitroparaffins such as phenyl-nitromethane or 1-nitro-2-cyclohexylethane. The primary nitroparaffins containing two or more carbon atoms are particularly suited for use in my process. Among the nitroparaffins, nitroethane, 1-nitropropane, 1-nitrobutane, and 1-nitro-2-methyl propane are particularly advantageous in that their boiling points constitute suitable reaction temperatures, and the reaction mixture may thus be simply refluxed to effect the conversion. It should be distinctly understood, however, that my invention is not to be limited to any particular nitrohydrocarbons of this series, but is generally applicable to all nitrohydrocarbons containing the group —$CH_2.NO_2$.

The acids which may be used to effect the conversion of the nitrohydrocarbons in my process may be any sulfonic acids having dissociation constants in excess of $10^{-2}$. Among such acids may be mentioned ethyl sulfonic acid, benzene sulfonic acid, m-nitro-benzene sulfonic acid, m-sulfo-benzoic acid, p-toluene sulfonic acid, beta naphthalene sulfonic acid, 1,5-nitro-naphthalene sulfonic acid, and m-benzene disulfonic acid. It will be evident, of course, that although any sulfonic acid having a dissociation constant in excess of the specified value will serve to effect the conversion of the nitrohydrocarbon into the corresponding carboxylic acid, some of these acids will be less advantageous than others. Thus, I have found that some of these acids are less active than others and must be employed in greater amounts, relative to the nitrohydrocarbon, to secure the desired degree of conversion. From the standpoint of activity, and also from the standpoint of raw material cost, I prefer to utilize benzene sulfonic acid, and I have found that the commercial grades of this acid, such as "65%" sulfonic acid, which contain some sulfuric acid are very satisfactory in my process. It should be distinctly understood, however, that my invention is not to be limited to the use of this or any of the other acids mentioned above. Any sulfonic acid having a dissociation constant in excess of $10^{-2}$ may be used, and one skilled in the art can readily choose a suitable acid for the particular reaction conditions to be employed.

I have found that the reaction of the present invention proceeds most rapidly with very concentrated acid solutions, but that the reaction will not proceed to completion unless 1 mol. of water per mol. of nitrohydrocarbon is provided in the reaction mixture. Thus, when employing anhydrous acids, a final conversion of nitrohydrocarbon to carboxylic acid of the order of 50% is obtained; but optimum conversion may then be secured by introducing 1 mol. of water per mol. of nitrohydrocarbon, and continuing the reaction until the intermediate products are completely transformed to the carboxylic acid stage. By this method it is possible to accelerate the first stage of the reaction with resulting decrease in the overall reaction time. The reaction is strongly exothermic, however, and the high reaction velocity secured by the use of very concentrated acids may cause difficulty unless adequate cooling means are provided. For this reason it is desirable to utilize an acid solution containing a certain amount of water, preferably approximately 1 mol. of water per mol. of nitrohydrocarbon. However, in the case of the lower molecular weight sulfonic acids the presence of 1 mol. of water per mol. of acid may lower the concentration below the optimum for conversion. Thus, in the case of benzene sulfonic acid, the most satisfactory reaction mixture constitutes 1 mol. of nitrohydrocarbon, and 1 mol. of benzene sulfonic acid in the form of 95% acid (constituting 1 mol. of acid and ½ mol. of water). With this mixture the acid concentration is sufficiently high to give rise to a rapid reaction rate without undue difficulty from the standpoint of heat evolution, and one-half of the required amount of water for the reaction is present in the initial mixture. In this case the remaining one-half of the required water may be added at the conclusion of the initial reaction, and the mixture then further refluxed for 5-15 minutes; or the additional water may be provided in the procedure utilized for recovering the products, as, for example, in a steam distillation. In general, it may be said that the preferred acid concentration is that which will give rise to a rapid conversion rate without unduly rapid evolution of heat, which will be sufficiently miscible with the nitrohydrocarbon to insure ease of reaction, and which will give rise to a final solution in which the resulting hydroxylamine salt is insoluble. An acid of 80% to 100% concentration will usually be found to be satisfactory, and preliminary experiments will readily determine the optimum concentration for any particular acid under the reaction conditions to be employed.

The reaction temperature is preferably maintained between 100° C. and 160° C. At temperatures lower than 100° C. the reaction velocity tends to become unsatisfactorily low, and at temperatures above 160° C. there is an increased tendency for decomposition reactions to take place. It will be evident, however, that higher temperatures may be suitably employed if the time of reaction is reduced sufficiently to avoid undue decomposition of the products. In a continuous process, for example, higher temperatures may be used in certain cases by increasing the space velocity in the reaction zone to a point at which the decomposition reactions proceed only to a very slight extent.

My invention may be illustrated by the following specific examples in which various nitrohydrocarbons are converted to the corresponding carboxylic acids by the use of a number of different types of acids as converting agents.

Example I

A reaction mixture comprising 75 parts by weight of nitroethane, 158 parts of commercial "65%" benzene sulfonic acid was refluxed with stirring for approximately 4 hours. The reaction temperature during this period ranged from 118 to 142° C. At the end of this period 18 parts of water were introduced, and the mixture was further refluxed for 10 minutes. The following results were secured:

| Product | Yield based on nitroethane reacted | Conversion based on nitroethane introduced |
| --- | --- | --- |
| Acetic acid | 91% | 90% |

Example II

A reaction mixture comprising 89 parts by weight of 1-nitropropane, 158 parts of benzene sulfonic acid and 9 parts of water was refluxed with stirring for 8 hours. The reaction temperature during this period ranged from 120 to 135° C. At the end of this period 9 parts of water was introduced, and the mixture was further refluxed for 10 minutes. The following results were secured:

| Product | Yield based on nitropropane reacted | Conversion based on nitropropane introduced |
| --- | --- | --- |
| Propionic acid | 91% | 91% |

Example III

A reaction mixture comprising 89 parts by weight of 1-nitropropane and 190 parts of p-toluene sulfonic acid (consisting of 172 parts acid and 18 parts water of crystallization) was refluxed with stirring for 6 hours. During this period the reaction temperature ranged from 125 to 131° C. The following results were secured:

| Product | Yield based on nitropropane reacted | Conversion based on nitropropane introduced |
| --- | --- | --- |
| Propionic acid | 90% | 74% |

Example IV

A reaction mixture comprising 89 parts by weight of 1-nitropropane and 226 parts of beta-naphthalene sulfonic acid (208 parts acid and 18 parts water of crystallization) was refluxed with stirring for 3½ hours. During this period the reaction temperature ranged from 120 to 125° C. The following results were secured:

| Product | Yield based on nitropropane reacted | Conversion based on nitropropane introduced |
| --- | --- | --- |
| Propionic acid | 85% | 78% |

Example V

A reaction mixture comprising 89 parts by weight of 1-nitropropane and 158 parts of "65%" commercial benzene sulfonic acid was refluxed for 3 hours. The reaction temperature ranged from 130 to 146° C. At the end of this period, 18 parts of water was introduced, and the mixture was further refluxed for 10 minutes. The following results were secured:

| Product | Yield based on nitropropane reacted | Conversion based on nitropropane introduced |
| --- | --- | --- |
| Propionic acid | 91% | 90% |

Example VI

A reaction mixture comprising 103 parts by weight of 1-nitrobutane, 158 parts of commercial "65%" benzene sulfonic acid was refluxed with stirring for 3 hours. During this period the reaction temperature ranged from 145 to 158° C. At the end of this period, 18 parts of water was introduced, and the mixture was further refluxed for 10 minutes. The following results were secured:

| Product | Yield based on nitrobutane reacted | Conversion based on nitrobutane introduced |
| --- | --- | --- |
| Butyric acid | 86% | 83% |

Example VII

A reaction mixture comprising 103 parts by weight of 1-nitro-2-methyl propane, 158 parts of commercial "65%" benzene sulfonic acid was refluxed with stirring for 3 hours. The reaction temperature ranged from 140 to 148° C. At the end of this period, 18 parts of water was introduced, and the mixture was further refluxed for 10 minutes. The following results were secured:

| Product | Yield based on nitromethylpropane reacted | Conversion based on nitromethyl propane introduced |
|---|---|---|
| Isobutyric acid | 76% | 70% |

It is to be understood, of course, that the above examples are illustrative only, and that my invention is not to be construed as limited to the particular materials or procedures set forth. Numerous modifications of procedure will naturally occur to those skilled in the art, and my invention includes any such modifications or the use of any obvious equivalents. For example, as has previously been mentioned, the reaction may be carried out under super-atmospheric pressure, and by increasing the pressure a higher reaction temperature may be secured in the case of the lower boiling nitrohydrocarbons, such as nitroethane, with a resulting increase in speed of conversion. In general, it may be said that a pressure should be employed which will insure liquid phase conditions at the reaction temperature utilized. Likewise, it will be evident that my invention can be carried out in a continuous manner by employing a reaction tube or vessel maintained at the desired reaction temperature, and passing the reaction mixtures through the heated zone at a space velocity sufficient to effect the desired reaction and minimize decomposition reactions. It will also be apparent that my process is applicable to the treatment of mixtures of nitrohydrocarbons as well as single compounds, and to the use of mixed acids as the converting agents as well as the single acids employed in the above examples. All such modifications which are not excluded by the scope of the appended claims are to be considered as included in my invention.

My invention now having been described, what I claim is:

1. A process for the production of carboxylic acids from primary nitrohydrocarbons, which comprises subjecting the hydrocarbon to the action of at least an equimolecular amount of a sulfonic acid having a dissociation constant in excess of $10^{-2}$, and providing at least 1 mol. of water per mol. of nitrohydrocarbon to complete the conversion to the carboxylic acid stage.

2. A process for the production of fatty acids from primary nitroparaffins, which comprises subjecting the nitroparaffin at a temperature in excess of 100° C. to the action of at least an equimolecular amount of a sulfonic acid having a dissociation constant in excess of $10^{-2}$, the initial concentration of said acid being at least 80% by weight, and providing at least 1 mol. of water per mol. of nitroparaffin to complete the conversion to the carboxylic acid stage.

3. A process for the production of fatty acids from primary nitroparaffins, which comprises subjecting the nitroparaffin at a temperature of 100° C. to 160° C. to the action of at least an equimolecular amount of a sulfonic acid having a dissociation constant in excess of $10^{-2}$, the concentration of said acid being such that there is present in the reaction mixture approximately 1 mol. of water per mol. of nitroparaffin.

4. A process for the production of fatty acids from primary nitroparaffins, which comprises subjecting the nitroparaffin at a temperature of 100° C. to 160° C. to the action of at least an equimolecular amount of benzene sulfonic acid, the initial concentration of said acid being at least 80% by weight, and providing at least 1 mol. of water per mol. of nitroparaffin to complete the conversion to the carboxylic acid stage.

5. A process for the production of fatty acids from primary nitroparaffins, which comprises subjecting the nitroparaffin at a temperature of 100° C. to 160° C. to the action of at least an equimolemular amount of p-toluene sulfonic acid, the initial concentration of said acid being at least 80% by weight, and providing at least 1 mol. of water per mol. of nitroparaffin to complete the conversion to the carboxylic acid stage.

6. A process for the production of fatty acids from primary nitroparaffins, which comprises subjecting the nitroparaffin at a temperature of 100° C. to 160° C. to the action of at least an equimolecular amount of beta-naphthalene sulfonic acid, the initial concentration of said acid being at least 80% by weight, and providing at least 1 mol. of water per mol. of nitroparaffin to complete the conversion to the carboxylic acid stage.

7. A process for the production of fatty acids from primary nitroparaffins, which comprises reacting the nitroparaffin at a temperature of 100° C. to 160° C. with at least an equimolecular amount of benzene sulfonic acid of approximately 95% concentration, and subsequently introducing additional water to provide a total of at least 1 mol. of water per mol. of nitroparaffin to complete the conversion to the carboxylic acid stage.

SAMUEL B. LIPPINCOTT.